May 27, 1969 TATSU HORI 3,445,981
METHOD AND MEANS FOR FORMING A SEED TAPE
Filed July 29, 1966 Sheet 1 of 3

INVENTOR.
TATSU HORI
BY Samuel Lindenberg
Abraham Wasserman
ATTORNEYS

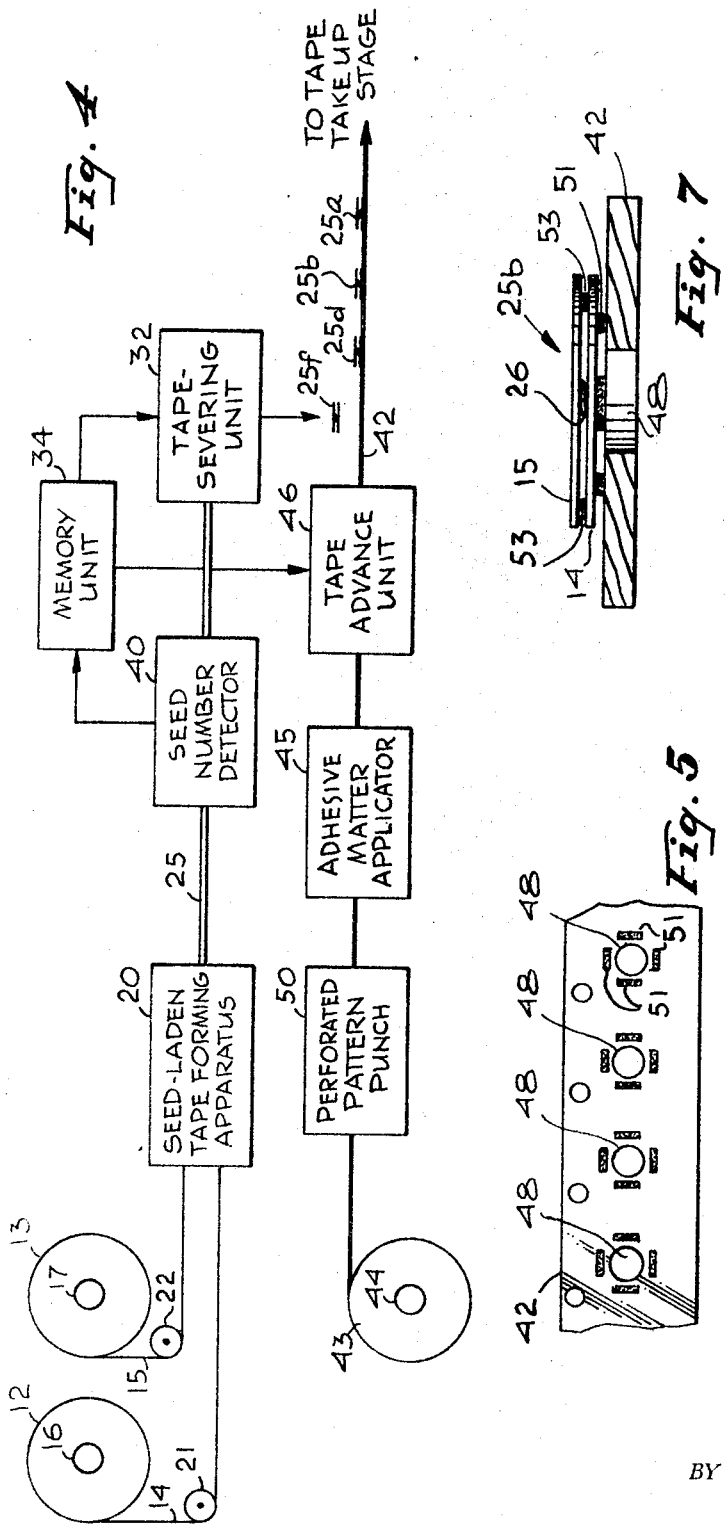

United States Patent Office 3,445,981
Patented May 27, 1969

3,445,981
METHOD AND MEANS FOR FORMING A SEED TAPE
Tatsu Hori, Los Altos, Calif., assignor, by mesne assignments, to Gates Rubber Company, Denver, Colo.
Filed July 29, 1966, Ser. No. 568,957
Int. Cl. B65b 9/02, 57/10; A01c 1/04
U.S. Cl. 53—28                                                15 Claims

ABSTRACT OF THE DISCLOSURE

Method and means for forming a seed tape by first affixing seeds on spaced increments of a long tape. Thereafter, the tape increments are inspected and, those containing single seeds are separated from those containing other than one seed. In one embodiment, those increments containing single seeds are severed from the seed tape and thereafter are equidistantly spaced on a carrier tape, to form a seed tape on which single seeds are located at spaced increments.

---

This invention relates to a method and means for assembling seeds and tape for pregermination and planting, and more particularly to improvements therein.

In an application for "Seed Pregerminating and Planting Process," Ser. No. 301,083, filed Aug. 9, 1963, now Patent No. 3,294,045, by Omer J. Kelley et al., which is assigned to a common assignee, there is described and claimed a process whereby seedsare spaced at equal spacings along the length of two rolls of tape to form a seed-laden-tape, with the seeds being substantially enclosed between the two tapes, one of which acts as a support tape, while the other serves as a cover tape. As described therein, a single seed is assumed to adhere and be enclosed at each spaced increment of the tape. After forming the seed-laden tape, the tape is treated, so that the seeds pregerminate uniformly. Then, at planting time tape increments, assumed to contain single seeds, are detached and planted at a uniform depth in individual planting holes or grooves.

In the process described in the above referred to application, the seeds are caused to adhere to the support tape, at selected spaced locations along the elongated sides of the cover tape which, when brought in contact with the support tape, encloses the seeds therebetween. It is assumed that single seeds are enclosed between increments of solid strips of the two tapes which are in adhesive contact at points along the elongated edges thereof. Although the process claimed in the above referred to application has been found to be quite significant in the uniform pregermination of seeds and in automating the planting of seeds so that preferably, a single seed is planted in each planting groove at a uniform depth, it has been found that with the present state of the art, when preparing a tape in accordance with the process some tape increments contain other than a single seed. That is, at some tape increments several seeds are enclosed, while at other locations, none of the seeds are enclosed between increments of the support and cover tapes. Due to such variations, perfect uniform spacing of single seeds along the tape as well as uniform pregermination of the seeds between the tapes is not attained. In addition, the use of a solid cover tape in the aforementioned process has resulted in certain problems in providing the seeds with sufficient freedom to develop, yet insure that the seeds remain enclosed between the two tapes.

It is therefore an object of the present invention to provide an improved process for preparing seeds for uniform pregermination.

Another object is to provide a new method and means for assembling seeds on a tape for pregermination and planting.

Another object is to provide a process and means for preparing a tape wherein only single seeds are affixed to increments thereof, so that all the seeds may be uniformly treated to pregerminate simultaneously.

A further object is the provision of an improved process for preparing a single-seed-laden tape wherein single seeds, though secured on separate increments of the tape, are exposable to pregermination treatment and free to pregerminate thereat.

These and other objects of the invention are achieved by providing a process in which seeds are attracted to predetermined spaced locations along a support tape which is covered by a cover tape. Suitable means are employed to adhere the cover tape to the support tape so that the seeds are affixed at each tape increment between the support and cover tape. Thereafter the support and cover tapes with the seeds therebetween, hereafter also referred to as the seed-laden tape, is inspected to determine the number of seeds affixed to each tape increment. The increments containing a single seed are separated from those containing other than one seed. In one embodiment of the process, the increments containing other than one seed are severed from the seed-laden tape which then comprises increments of seed-laden tape containing single seeds, interspersed by holes or openings which are created by the severing of the tape increments which contained other than one seed. In another embodiment of the process, each of the seed-laden tape increments containing a single seed is severed from the tape. The severed tape increments are then deposited onto a carrier tape at fixed spaced locations to comprise an improved tape on which only single seeds are affixed at the fixed spaced locations. Tapes containing single seeds at equal interval locations may be thought of as single-seed-laden tapes, which may be distinguished from the seed-laden tape produced by the prior art process in which at some tape increments other than one seed are located.

In accordance with the teachings of the present invention, in order to facilitate the access of pregerminating treating matter to the seeds affixed between the support and cover tape increments, increments of at least the cover tape are preferably perforated at spaced locations, so that each seed is covered by a perforated cover tape increment through which the treating matter may be applied to the seed. Further, the perforated increment facilitates the free development and expansion of the pregerminating seed yet, insures that the seed does not dislodge itself from the increment of tape on which it is supported. In addition to perforating the cover tape the support tape may also be perforated to further facilitate the free development of the seeds supported thereon.

The novel features that are considered characteristics of this invention are set forth with particularity in the appended claims. The invention itself both as to its organization and method of operation, as well as additional objects and advantages thereof, will best be understood from the following description when read in connection with the accompanying drawings, in which:

FIGURE 4 is a block diagram of an embodiment of an apparatus for forming another type of a single-seed-laden tape;

FIGURE 5 is a top view of a carrier tape employed in the apparatus of FIGURE 4;

FIGURE 6 is a top view of the carrier tape shown in FIGURE 5, with tape increments containing single seeds thereon;

FIGURE 7 is a cross sectional view along lines 2—2 in FIGURE 6;

Figure 1:
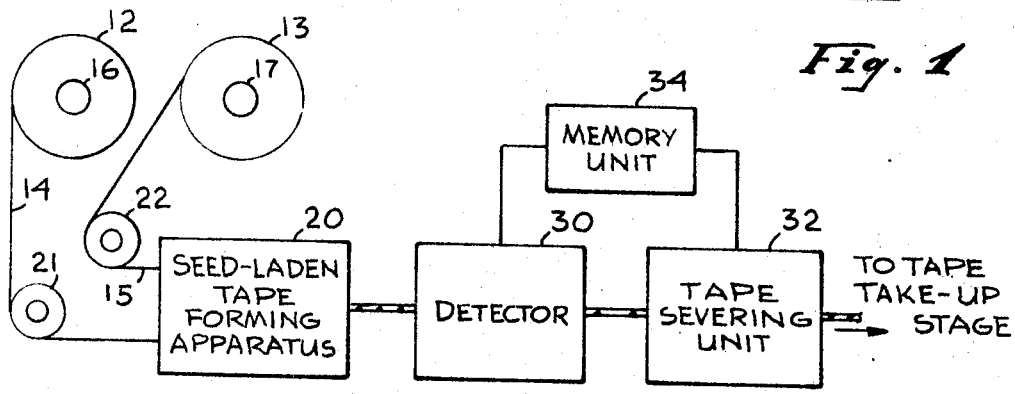
FIGURE 1 is a block diagram of one embodiment of an apparatus for forming a single-seed-laden tape.
Figure 11:
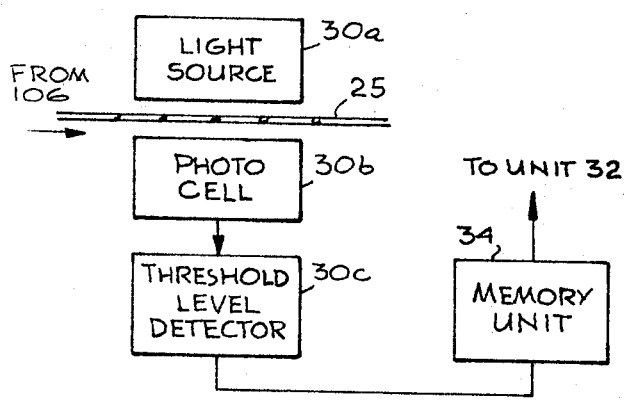
Figure 10:
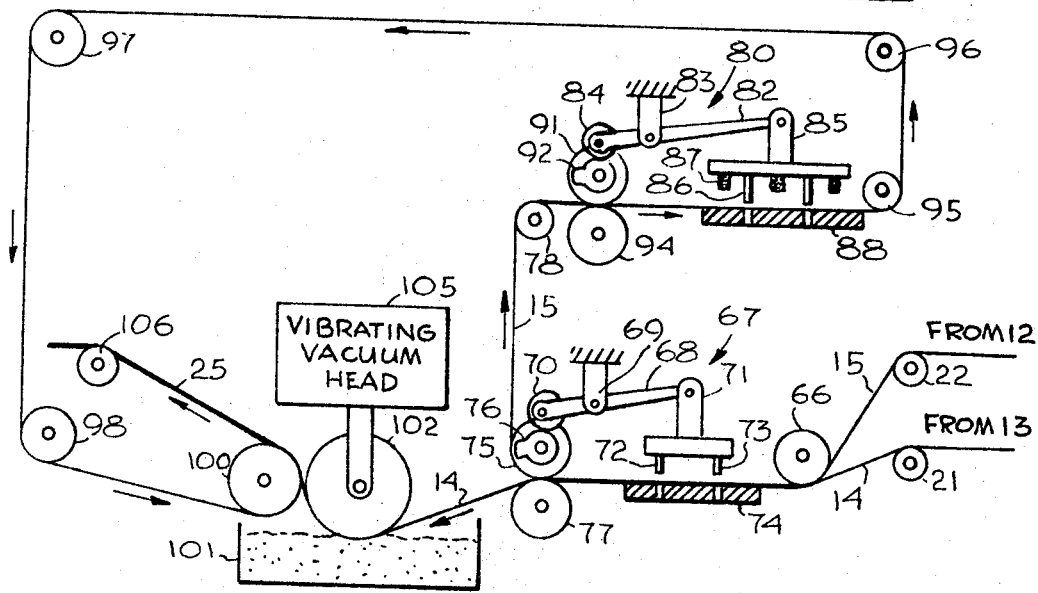
Figure 9:
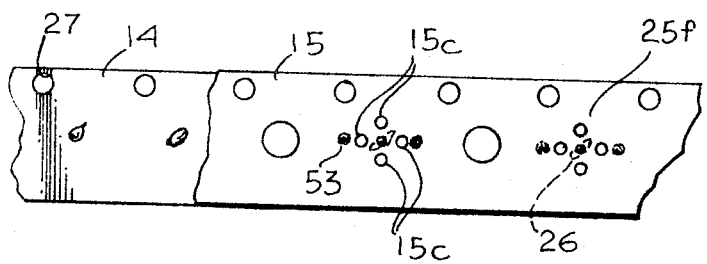

FIGURE 8 comprises a plurality of top views of printed perforation patterns;

FIGURE 9 is a top view of a single-seed-laden tape with a perforated cover tape;

FIGURE 10 is a side view of one embodiment of a tape forming apparatus shown in FIGURES 1 and 4;

FIGURE 11 is a block diagram of an electronic seed-number detector; and

Figure 12:
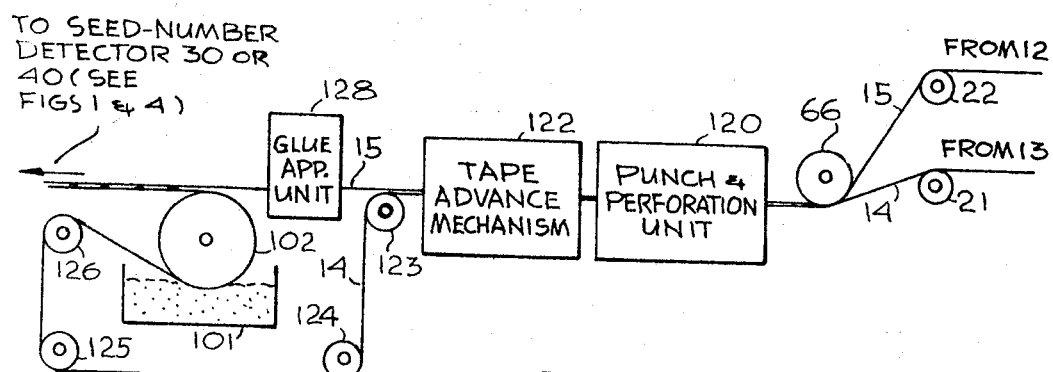

FIGURE 12 is a simplified diagram of another embodiment of the tape forming apparatus, shown in FIGURES 1 and 4.

Attention is first directed to FIGURE 1 which is a block diagram of an apparatus for forming of a single-seed-laden tape in accordance with the teaching of the present invention. The apparatus includes reels 12 and 13 of suitable elongated strips of tape 14 and 15 rotatably mounted on axles 16 and 17 respectively. Tapes 14 and 15, assumed to comprise support and cover tapes respectively, are supplied to a seed-laden tape forming apparatus 20 over idler rollers 21 and 22 respectively. The function of apparatus 20 one embodiment of which is described in the aforementioned application is to form a seed-laden tape such as tape 25 shown in FIGURE 2 wherein at equally spaced tape increments, such as 25a through 25f, single seeds 26 are affixed between the support tape 14 and cover tape 15. Index holes 27 useful in advancing the tape a fixed length equal to the spacing between tape increments, are also defined therein.

The desired seed-laden tape formed by apparatus 20 is one in which a single seed 26 is affixed at each of the tape increments. However, from practice it has been found that due to the very small size of the seeds, at the present state of the art, some increments may contain more than one seed while others may not contain even a single seed.

Figure 2:
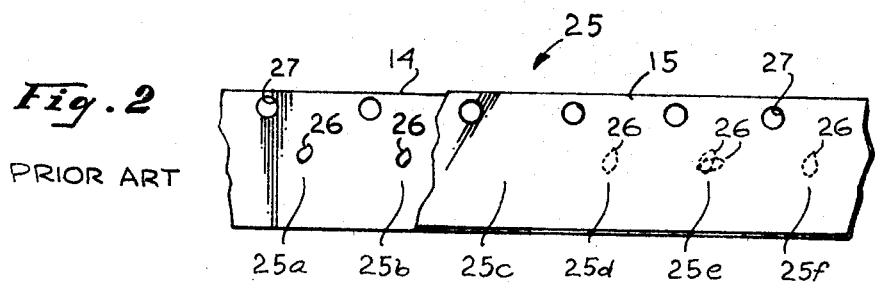
FIGURE 2 is a top view of a seed-laden tape, produced in accordance with a prior art method.

As seen from FIGURE 2 only increments 25a, 25b, 25d and 25f are shown to contain single seeds, while increments 25c and 25e are assumed to contain zero and two seeds respectively. Such a tape with an irregular number of seeds at its equally spaced increments is not as useful as one with increments in which a single seed is contained, since the presence of several seeds at a single location may hamper the uniform emergence of the seeds, while the absence of a single seed from some tape increments may result in irregular planting when the tape is employed in an automatic planting apparatus.

In accordance with the teachings of the present invention, however, a process is employed to modify the irregular seed-laden tape such as diagrammed in FIGURE 2 and provide a single-seed-laden tape, in which single seeds are contained at the tape increments. In accordance with one embodiment of the process of the invention the irregular seed-laden tape 25 (see FIGURE 2) provided by apparatus 20 (FIGURE 1) is passed through a detector 30 to a tape severing unit 32. The function of the detector 30 is to sense tape increments such as 25c and 25e, containing other than one seed 26, and supply signals to unit 32 to sever, such tape increments from the rest of the seed-laden tape. The signals from detector 30 to unit 32 are shown passing through a memory unit 34, the function of which is to delay the actuation of the unit 34 by a time required for each of the tape increments to be severed to move the distance from the detector 30 to a point, such as the location of a severing member in unit 32.

Figure 3:
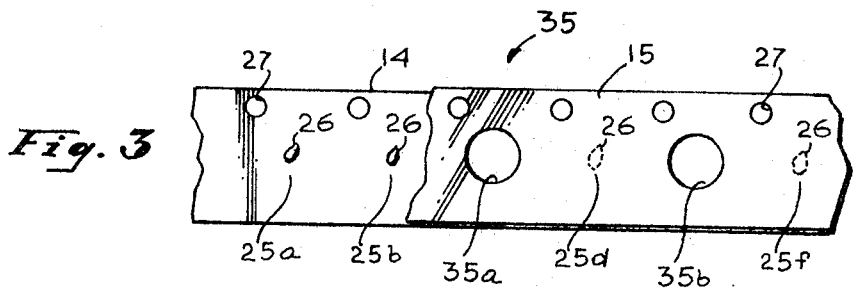
FIGURE 3 is a top view of a single-seed-laden tape, of the type formed by the apparatus of FIGURE 1.

As a result, the output of unit 32 is a single-seed-laden tape 35, shown in FIGURE 3 to which reference is made herein. Tape 35 is similar to tape 25 in that it contains all the tape increments such as 25a, 25b and 25f, each containing a single seed. However, tape 35 includes openings 35a and 35b which define the locations previously occupied by tape increments 25c and 25e respectively, containing other than a single seed.

In accordance with another embodiment of the present invention a single-seed-laden tape is formed by an apparatus diagrammed in block form in FIGURE 4, to which reference is made herein. Therein the tape 25 from apparatus 20 is supplied to the tape severing unit 32 through a seed-number detector 40 the function of which is to sense the number of seeds at each increment and supply signals through memory unit 34 to unit 32 in response to each tape increment detected to contain a single seed. In response to these signals, the increments such as 25a, 25b, 25d and 25f containing single seeds are severed by unit 32. The severed single-seed-containing tape increments are equidistantly deposited along the length of a carrier tape 42, supplied from a tape reel 43 rotatably mounted on an axle 44. The carrier tape 42 preferably passes through an adhesive matter applicator 45, which applies adhesive matter of a selected pattern to spaced increments along the carrier tape. A tape advance unit 46 in response to each of the signals from memory unit 34 advances the carrier tape a fixed distance, so that each of the single seed containing tape increments severed by unit 32 is deposited onto another of the patterns of adhesive matter on the carrier tape to be adhesively affixed thereto. Thus the final tape comprises a carrier tape on which single seed containing tape increments are affixed. The carrier tape may comprise a relatively heavy strong single strip of paper.

To facilitate the exposure of each seed to pregerminating solutions the carrier tape 42 has holes designated by numeral 48 shown in FIGURE 5 to which reference is made herein. The holes are preferably punched at equally spaced locations by a punch 50 (FIGURE 4). Then, the punched carrier tape is advanced to applicator 45 to apply adhesive matter in a selected pattern about each hole. In FIGURE 5 numeral 51 designates the adhesive hole. The diameter of each of the holes is less than the diameter of the tape increments severed by unit 32, so that each severed increment may be deposited over a hole 48 and securely affixed to the carrier tape 42 by adhesive matter 51. FIGURE 6 represents a top view of the carrier tape 42 with single seed containing tape increments 25a, 25b, 25d and 25f (FIGURE 2) affixed thereto over holes 48 at a fixed spaced distance from one another, while FIGURE 7 is a view along the lines 2—2 in FIGURE 6. In FIGURE 7 numeral 3 designates adhesive matter applied to cover tape 15 in apparatus 20 so that support and cover tapes 14 and 15 adhere to one another with seed 26 therebetween.

From the foregoing description it should be appreciated that, in accordance with the teachings of the invention methods and means are disclosed, whereby single-seed-laden tapes are formed in which single seeds are affixed to each tape increment which contains seeds. In the embodiment of the tape 35 (FIGURE 3) tape increments containing other than one seed are severed from the tape, while in the embodiment shown in FIGURE 6 single seeds are affixed at all fixed locations equidistantly spaced along the length of the carrier tape 42. Either single-seed-laden tape may be treated to pregerminate the seeds, which because of their individual spacings will pregerminate uniformly. Thereafter, the tape with the pregerminated seeds may be employed in a planting apparatus capable of automatically severing each tape increment containing a uniformly pregerminated single seed and plant it at a selected depth so that all seeds tend to sprout and reach maturity at substantially the same time.

Herebefore the single-seed-laden tapes formed in accordance with the teachings of the invention were described in conjunction with a continuous solid cover tape 15 (FIGURES 1 and 2). Consequently, each single seed is affixed on the solid support tape increment and covered by a solid increment of the cover tape. It has been found that in certain applications the solid cover tape increment may impede the germination of the enclosed seed, due to excessive forces required for the seed to pierce the cover tape as it grows. Therefore, in accordance with the teachings of the invention, when desired, a pre-perforated cover tape may be applied over the seed-laden support tape so that each seed is covered by a perforated section or increment of the cover tape, rather than a solid portion thereof. When desired, the support tape may also be preperforated so that each seed is actually contained between two perforated tape increments.

The perforation of the cover tape may be accomplished in apparatus 20 by perforating it, at equally spaced locations, with a preselected perforation pattern. The pattern may include holes and/or slots so that a minimum of force is required for a growing seed to pierce the cover tape. However, the pattern must contain a sufficiently large unperforated tape portion to prevent the seed from being dislodged from the support tape, as well as, insure the presence of sufficient moisture around the seed, prior to it being irrigated in its planted position.

Attention is directed to FIGURE 8 which represents top views of cover tape 15 with different perforation patterns designated 15a through 15c. Pattern 15c comprises a plurality of holes while the other patterns consist of different slot arrangements. In FIGURE 8 the dashed circle around each of the patterns denotes the outside boundary thereof. It should be noted that the center of each pattern is solid, rather than perforated, to insure the proper protection of each seed when the cover tape is properly applied to the support tape. Yet the adjacent perforations aid in enabling the growing seed to pierce the cover tape with a minimum of force.

It has been found that when utilizing a perforated cover tape it is preferred to adhesively couple the cover tape to the support tape by adhesive matter applied in a pattern of several dots, designated in FIGURE 8 by numeral 53. It is preferred to have one dot of adhesive matter in the center of the perforated pattern, so that when the cover tape is properly applied, the central dot of adhesive matter further secures the seed between the support and cover tapes. The outside dimension of the perforated pattern is preferably twice the length of the longest expected seed. FIGURE 9 to which reference is made herein represents a single-seed-laden tape, similar to tape 35 shown in FIGURE 3, but for the cover tape 15 which is assumed to be perforated with pattern 15c.

Reference is now made to FIGURE 10 which is a simplified cross-sectional view of one embodiment of apparatus 20 (FIGURE 1), for forming a seed-laden tape with only the cover tape being perforated in a manner hereinbefore described. Support and cover tapes 14 and 15 respectively from idler rollers 21 and 22 pass over a common idler roller 66 to a punch, generally indicated by numeral 67. The punch 67 has a lever 68, pivoted on a pin 69. One end of lever 68 has a cam follower 70 mounted thereon while the other end has a punching mechanism 71 connected thereto. The punch mechanism is provided with punch members 72 and 73 which cooperate with a base 74 underlying the tapes 14 and 15. The cam follower 70 cooperates with a roller 75 which has an eccentric cam 76 mounted thereon. Rotation of roller 75 causes the lever 68 to pivot around its fulcrum and the punch members 72 and 73 to punch holes at equal increments along the tapes 14 and 15. Member 72 is used to punch the index hole 27 (FIGURE 9), while member 73 punches smaller holes (not shown) used to attract seeds to the support tape, as will be described hereafter. An idler roller 77 is provided immediately underneath roller 75 to keep the tapes 14 and 15 in engagement with the roller 75. Thereafter the tapes 14 and 15 are separated from one another. Tape 15 passes over an idler roller 78 and therefrom to a punch and glue unit, generally designated by numeral 80. The function of unit 80 is to perforate increments of cover tape 15 at equal spacings with a selected perforation pattern such as one of those shown in FIGURE 8, as well as apply adhesive matter near the perforated cover tape increment such as the glue dot 53, shown in FIGURE 9.

The punch and adhesive applicator unit 80, which is similar to punch 67 hereinbefore described, includes a lever 82 pivoted on a pin 83. One end of the lever 82 has a cam follower 84 mounted thereon while a punching and glue mechanism 85 is connected to the other end thereof. For explanatory purposes only mechanism 85 is shown including members 86 which are assumed to perforate the cover tape in the desired pattern and glue applicators 87 depositing three dots of glue 53 onto each cover tape increment. Members 86 and 87 cooperate with a base 88 underlying tape 15 passing thereover. Mechanism 85 may consist of a single unit or actually comprise two separate units, one for perforating the cover tape 15 and the other for applying the adhesive matter thereto.

Cam follower 84 cooperates with a roller 91, having an eccentric cam 92 mounted thereon. Rotation of roller 91 causes the lever 82 to pivot around fulcrum 83 and thereby cause members 86 to perforate the cover tape 15 in a desired pattern, as well as cause members 87 to apply the adhesive matter or glue to the cover tape. An idler roller 94 is provided immediately underneath roller 91 to keep tape 15 in engagement with roller 91.

From unit 80 tape 15 passes over rollers 95 through 98 to a roller 100, overlying a seed hopper 101. The support tape 14 has meanwhile been passed to a drum 102, forming part of a vibrating vacuum head 105 positioned over the seed hopper 101. The function of the small holes punched by member 73 is to cause the air flow through the seed hole, produced by the vacuum head 105 to attract one or more seeds to the side of the support tape 14 passing through the seed hopper 101, while the function of the vibrating head 105 is to tend to remove all except one of the seeds over the hole back into hopper 101. However, as has been found, due to the very small size of the seeds, at the present state of the art, in some cases, other than a single seed are attracted to the support tape. Generally, the number of seeds attracted to the support tape at each hole may be represented by N, where N is equal to or greater than zero.

Tape 14, with the seeds affixed thereto, is now also passed over roller 100. The perforated tape 15 comes in contact therewith so that each perforated cover tape increment adheres over the support tape increment to which the seeds are affixed by the adhesive matter 53 on the cover tape 15. The travel distance for each of the tapes from roller 77 to roller 100 is preferably kept equal or other conventional precautions taken to insure the proper mating of each perforated cover tape increment over the increment of support tape to which one or more seeds are affixed. The two tapes with the seeds therebetween forming the seed-laden tape 25 are passed over an idler roller 106, and therefrom supplied to the detector and the tape severing unit shown in FIGURES 1 and 4, for forming the single-seed-laden tapes in accordance with the teachings disclosed herebefore.

Reference is now made to FIGURE 11 which is a simplified diagram of one embodiment of a seed-number detector capable of providing signals as a function of the number of seeds affixed to each increment of the seed-laden tape 25 passing therethrough. In FIGURE 11 the detector is shown comprising a light source 30a and a photocell 30b, the output of which is supplied to a threshold level detector 30c. As is appreciated by those familiar with the art, the light from source 30a received by photocell 30b will vary as a function of the number of seeds interposed therebetween. Consequently, the output of photocell 30b may be detected by detector 30c to provide an output signal only when the desired number of seeds are detected between the source and the photocell. In the embodiment shown in FIGURE 1, the threshold level detector 30c is adjusted to provide an output signal only when other than a single seed is detected between the light source and the photocell. As a result, tape increments of tape 25, containing other than a single seed are severed by the tape severing unit 32, to provide a single-seed-laden tape 35, as diagrammed in FIGURE 3. On the other hand when the embodiment diagrammed in FIGURE 4 is employed, the detector is adjusted to provide an output signal only when a single seed is detected between source 30a and photocell 30b, to sever the tape increments containing single seeds and deposit them on the carrier tape 42 in a manner hereinbefore described in conjunction with FIGURE 4.

The memory unit 34 to which the output signals from threshold level detector 30c are supplied may comprise an electrical or an electromechanical device constructed in accordance with any one of presently known techniques to delay the signal by a time period sufficient for the particular tape increment to be severed to reach the severing member of the tape severing unit 32. Tape severing unit 32 may comprise a punch, mechanically or electromechanically operated, to sever or punch out the desired tape increment from the seed-laden tape 25 passing thereby.

As herebefore indicated, in some applications it may be desirable to perforate both the cover and support tapes. This may be accomplished in a tape forming apparatus as diagrammed in FIGURE 12, wherein the support and cover tapes 14 and 15 are shown supplied to a punch and perforation unit 120. Unit 120 is assumed to perform the operations of mechanism 67 (FIGURE 10) and the punching function of unit 80. That is, in unit 120 the support and cover tapes are perforated and in addition the index holes 27 (FIGURE 3) and small holes to attract the seeds to the tape are punched. The tapes are advanced by a tape advance mechanism 122, the function of which is to advance the tapes through the tape forming apparatus From mechanism 122 the tapes are advanced to an idler roller 123, at which the tapes are separated. Support tape 14 is caused to pass over idlers 124, 125 and 126 and to the drum 102 of vacuum vibrating head 105 (FIGURE 10), while cover tape is advanced to a glue application unit 128. Unit 128 applies adhesive matter such as glue in the desired pattern, such as the three dot pattern, shown in FIGURE 9 by numerals 53. At the drum 102, the two perforated tapes are combined with seeds contained between perforated tape increments. Therefrom, the tapes are supplied to the seed-number detector to modify the tape and form either of the two embodiments of the single-seed-laden tapes, herebefore described.

As herebefore explained, in conjunction with the embodiment diagrammed in FIGURE 4, in a preferred arrangement, the carrier tape 42 is preferably punched with holes 48 (FIGURE 5) with an adhesive matter applied thereto in a particular pattern designated by numeral 51 in FIGURE 5. These operations are performed on tape 42, prior to receiving the tape increments containing single seeds which are severed by unit 32. The punch 50 and adhesive matter applicator 44, required to punch the tape and apply the adhesive matter thereto may be similar to the punch and adhesive applicator unit 80 shown in FIGURE 10. However, it should be appreciated that any suitable mechanism may be employed to punch the holes in the tape and apply the adhesive matter about each punched hole. Similarly, any conventional means may be employed to constitute the tape advance unit 46 necessary to advance the carrier tape by fixed increments so that the single-seed-laden tape deposited thereon from unit 32 are equally spaced thereon.

There has accordingly been shown and described herein means and a process for forming single-seed-laden tapes wherein single seeds, capable of being pregerminated are affixed at separate tape increments between a support and a cover tape, so that when the single-seed-laden tape is treated with a suitable solution, all the seeds thereon are uniformly pregerminated. Furthermore, in accordance with the teachings of the present invention, the cover tape used to protect the seeds, is preferably perforated in any of a plurality of preselected perforation patterns to enable the pregerminating seeds to easily pierce through the cover tape during their growth, while at the same time securing the seeds from being accidentally dislodged from the support tape. In a preferred embodiment seed growth is further facilitated by pre-perforating both the cover and support tapes, as described in conjunction with FIGURE 12.

It is appreciated that those familiar with the arts may make modifications and/or substitute equivalents in the arrangements as shown without departing from the true spirit of the invention. Therefore, all such modifications and/or equivalents are deemed to fall within the scope of the invention as claimed in the appended claims.

What is claimed is:

1. A process for assembling seeds on a tape for uniform pregermination the steps comprising:
    affixing seeds on increments of a tape at spaced locations along the length of said tape;
    inspecting said seed-containing increments of said tape at said spaced locations; and
    separating the tape increments containing a single seed from tape increments to which none or more than one seed are affixed.

2. The process defined in claim 1 wherein said tape increments containing none or more than one seed are severed from said tape whereby the remaining tape consists of single seed containing increments, and holes at the locations of the tape increments which have been severed from said tape.

3. A process for assembling seeds on a tape for uniform pregermination the steps comprising:
    affixing seeds on increments of a tape at spaced locations along the length of said tape;
    inspecting said seed-containing increments of said tape at said spaced locations;
    severing the tape increments containing a single seed from the tape containing increments to which none or more than one seed are affixed; and
    affixing the severed single seed containing tape increments at equally spaced locations on a separate carrier tape.

4. A process for preparing seeds for uniform pregermination by forming a single-seed-laden tape the steps comprising:
    securing seeds between increments equally spaced along the lengths of a support tape and a cover tape to form a seed-laden tape, each increment containing N seeds, N being equal or greater than zero;
    inspecting each increment of said seed-laden-tape containing N seeds for the number of seeds therein; and
    separating the seed laden tape increments containing single seeds from those containing other than single seeds.

5. The process defined in claim 4 wherein said tape increments containing other than one seed are severed from said tape whereby the remaining tape consists of single seed containing increments, and holes where the other tape increments have been severed from said tape.

6. A process for preparing seeds for uniform pregermination by forming a single-seed-laden tape the steps comprising:
    securing seeds between increments equally spaced along the lengths of a support tape and a cover tape to form a seed-laden tape, each increment containing N seeds, N being equal or greater than zero;
    inspecting each increment of said seed-laden-tape containing N seeds for the number of seeds therein;
    severing the seed-laden tape increments containing single seeds from the tape containing increments with other than single seeds; and affixing the severed single-seed-containing tape increments at equally spaced locations on a carrier tape.

7. The process defined in claim 4 wherein equally spaced increments of at least said cover tape are perforated in a predetermined pattern, so that the N seeds at each seed-laden tape increment are covered by a perforated increment of said cover tape.

8. A process for preparing seeds for uniform pregermination by forming a single-seed-laden tape the steps comprising:

securing seeds between increments equally spaced along the lengths of a support tape and a cover tape to form a seed-laden tape, each increment containing N seeds, N being equal or greater than zero;

inspecting each increment of said seed-laden-tape containing N seeds for the number of seeds therein; and separating the seed laden tape increments containing single seeds from those containing other than single seeds, equally spaced increments of at least said cover tape being perforated in a predetermined pattern, so that the N seeds at each seed-laden tape increment are covered by a perforated increment of said cover tape, and the dimension of said perforation pattern in the direction of the length of said cover tape is not smaller than the length of one of the seeds contained thereby.

9. The process defined in claim 8 wherein said tape increments containing other than one seed are severed from said tape whereby the remaining tape consists of single-seed containing increments, and holes at the locations of the tape increments which have been severed from said tape.

10. The process defined in claim 8 wherein said tape increments containing a single seed are severed from said tape, the process further including the step of affixing the severed single-seed-containing tape increments at equally spaced locations on a separate carrier tape.

11. In combination with a first source of a support tape and a second source of a cover tape apparatus for providing a single-seed-laden tape wherein single seeds to be germinated are affixed to separate increments of said support tape and covered by said cover tape comprising:

means defining tape increments at spaced locations along said support and cover tapes, received from said first and second sources, respectively;

means for perforating the increments of at least said cover tape with a predetermined perforation pattern at spaced locations along its length the spaced locations along the length of said support and cover tapes being equal to one another;

a source of seeds;

means for passing said support tape adjacent said source of seeds;

means for attracting N seeds to one side of each increment of said support tape, $N \geq 0$;

means for depositing adhesive matter on one side of a portion of each perforated increment of said cover tape;

means for adhering the side of each perforated increment of the cover tape with the adhesive matter to each support tape increment with the seeds thereon, whereby the N seeds adhering to each increment of the support tape are covered by a perforated segment of said cover tape;

means for inspecting the number of covered seeds adhering to said support tape increments and providing signals indicative of the number of seeds; and separating means responsive to the signals from said means for inspecting for separating the support tape increments to which single seeds adhere from increments to which adhere other than one seed.

12. The apparatus defined in claim 11 wherein said separating means comprise tape severing means and said means for inspecting provide signals actuating said severing means to sever tape increments containing other than one seed from said tape.

13. The apparatus defined in claim 12 wherein said means for perforating perforates both said cover tape and said support tape whereby each seed on said severed tape is contained between perforated support and cover tape increments.

14. The apparatus defined in claim 11 wherein said separating means comprise tape severing means and said means for inspecting provide a signal actuating said severing means to sever only tape increments containing single seeds, said apparatus further including a source of a carrier tape and means for advancing said carrier tape adjacent said severing means whereby the tape increments severed by said severing means are equidistantly deposited along said carrier tape.

15. The apparatus defined in claim 14 wherein said means for perforating perforates both said cover tape and said support tape whereby each tape increment severed by said severing means comprises perforated support and cover tape increments with a single seed therebetween.

References Cited

UNITED STATES PATENTS

| 1,364,050 | 12/1920 | Gray | 53—28 |
| 3,327,398 | 6/1967 | Leslie et al. | 250—219 X |
| 3,359,702 | 12/1967 | Beert et al. | 53—53 |

THERON E. CONDON, Primary Examiner.

G. F. DESMOND, Assistant Examiner.

U.S. Cl. X.R.

47—56; 53—53, 54, 180